United States Patent
Youn et al.

(10) Patent No.: US 9,475,490 B2
(45) Date of Patent: Oct. 25, 2016

(54) METHOD AND SYSTEM FOR CONTROLLING HYBRID VEHICLE

(71) Applicant: Hyundai Motor Company, Seoul (KR)

(72) Inventors: Kilyoung Youn, Gyeonggi-Do (KR); Gubae Kang, Gyeonggi-Do (KR); Jiwan Cha, Incheon (KR); Jinho Kim, Gyeonggi-Do (KR); Sang-Hwan Kim, Gyeonggi-Do (KR); Jae-Sang Lim, Gyeonggi-Do (KR)

(73) Assignee: Hyundai Motor Company, Seoul (KR)

( * ) Notice: Subject to any disclaimer, the term of this patent is extended or adjusted under 35 U.S.C. 154(b) by 10 days.

(21) Appl. No.: 14/546,903

(22) Filed: Nov. 18, 2014

(65) Prior Publication Data

US 2016/0031440 A1    Feb. 4, 2016

(30) Foreign Application Priority Data

Jul. 30, 2014    (KR) .................. 10-2014-0097366

(51) Int. Cl.
| B60W 20/00 | (2016.01) |
| B60W 10/06 | (2006.01) |
| B60W 10/30 | (2006.01) |
| B60W 10/08 | (2006.01) |

(52) U.S. Cl.
CPC .............. *B60W 20/50* (2013.01); *B60W 10/06* (2013.01); *B60W 10/08* (2013.01); *B60W 10/30* (2013.01); *B60W 2510/0638* (2013.01); *B60W 2510/085* (2013.01); *B60W 2710/0644* (2013.01); *B60W 2710/30* (2013.01); *Y02T 10/6286* (2013.01); *Y10S 903/93* (2013.01)

(58) Field of Classification Search
CPC .... B60W 20/50; B60W 10/06; B60W 10/30; B60W 10/08; B60W 2510/085; B60W 2710/0644; B60W 2710/30; B60W 2510/0638; Y10S 903/93

See application file for complete search history.

(56) References Cited

U.S. PATENT DOCUMENTS

| 6,269,895 B1 * | 8/2001 | Tanuguchi ............. B60K 6/365 180/65.1 |
| 7,357,213 B2 * | 4/2008 | Ji .......................... F02N 11/006 180/305 |

(Continued)

FOREIGN PATENT DOCUMENTS

| KR | 10-2008-0087487 A | 10/2008 |
| KR | 10-0921098 B1 | 10/2009 |

(Continued)

*Primary Examiner* — Truc M Do
(74) *Attorney, Agent, or Firm* — Mintz Levin Cohn Ferris Glovsky and Popeo, P.C.; Peter F. Corless

(57) ABSTRACT

A method and system for controlling a hybrid vehicle are provided to supply oil pressure to a transmission using an electric oil pump. The method for controlling a hybrid vehicle including an engine, a driving motor, and an engine clutch connecting between the engine and the driving motor includes: detecting a failure of high voltage components for the hybrid vehicle including an air conditioner, a heater, and a low voltage DC-DC converter (LDC). In response to determining a failure of at least one of the high voltage components an operation of the high voltage components in a normal state are turned off. The electric oil pump is operated with a counter electromotive force generated from the driving motor by operating the driving motor with power of the engine while a speed (RPM) of the engine is maintained at a predetermined minimum demand speed or greater.

12 Claims, 4 Drawing Sheets

(56) References Cited

U.S. PATENT DOCUMENTS

| | | | |
|---|---|---|---|
| 8,371,823 B2* | 2/2013 | Lee | F04B 49/06 417/22 |
| 2005/0067200 A1* | 3/2005 | Jiang | B60K 6/48 180/65.25 |
| 2007/0080582 A1* | 4/2007 | Tanaka | F16D 48/066 303/115.4 |
| 2007/0204816 A1* | 9/2007 | Russell | F01L 13/04 123/90.12 |
| 2009/0021203 A1* | 1/2009 | Claeys | B60K 6/52 318/452 |
| 2009/0118878 A1* | 5/2009 | Park | B60K 6/48 701/22 |
| 2010/0145562 A1* | 6/2010 | Moran | B60K 6/46 701/22 |
| 2013/0124022 A1* | 5/2013 | Persson | F01M 1/16 701/22 |
| 2013/0124027 A1* | 5/2013 | Tanishima | B60K 6/48 701/22 |
| 2013/0260955 A1* | 10/2013 | Kimata | B60K 6/52 477/3 |
| 2013/0260957 A1* | 10/2013 | Ueda | B60K 6/52 477/5 |
| 2013/0311023 A1* | 11/2013 | Nozaki | B60K 6/365 701/22 |
| 2014/0073478 A1* | 3/2014 | Hashemi | F02D 41/042 477/5 |
| 2014/0129119 A1* | 5/2014 | Park | F02N 19/00 701/113 |
| 2014/0210262 A1* | 7/2014 | Yaegaki | B60K 6/48 307/10.1 |

FOREIGN PATENT DOCUMENTS

| | | |
|---|---|---|
| KR | 10-2010-0041615 | 4/2010 |
| KR | 10-2014-0076323 A | 6/2014 |
| KR | 10-2014-0087581 A | 7/2014 |

* cited by examiner

METHOD AND SYSTEM FOR CONTROLLING HYBRID VEHICLE

CROSS-REFERENCE TO RELATED APPLICATION

This application claims priority to and the benefit of Korean Patent Application No. 10-2014-0097366 filed in the Korean Intellectual Property Office on Jul. 30, 2014, the entire contents of which are incorporated herein by reference.

BACKGROUND OF THE INVENTION (a) Field of the Invention

The present invention relates to a method and a system for controlling a hybrid vehicle, and more particularly, to a method and a system for controlling a hybrid vehicle capable of supplying oil pressure to a transmission using an electric oil pump.

(b) Description of the Related Art

Generally, an automatic transmission is connected to an oil pump system to supply actuating oil pressure to an automatic transmission. The oil pump system includes at least one oil pump. In related art, an oil pump system which uses both a mechanical oil pump (MOP) and an electric oil pump (EOP) to supply actuating oil pressure to an automatic transmission has been developed.

Further, a hybrid vehicle of the related art uses a method for controlling an oil pump system which divides a driving section into a stop section, a low-speed section, and a high-speed section based on a driving state of a vehicle and selectively operates the mechanical oil pump and the electric oil pump. For example, the method for controlling an oil pump system operates only the electric oil pump in the stop section, simultaneously operates the mechanical oil pump and the electric oil pump in the slow-speed section, and operates only the mechanical oil pump in the high-speed section.

However, when at least two oil pumps such as the mechanical oil pump and the electric oil pump are used, production costs may substantially increase. Further, the mechanical oil pump operated by a driving torque of an engine may cause an adverse effect on fuel efficiency of the vehicle.

Meanwhile, when one of the mechanical oil pump and the electric oil pump is removed, the actuating oil pressure may be difficult to supply substantially stably to the automatic transmission. In particular, when using only the electric oil pump and when the supply of oil pressure to the automatic transmission is insufficient due to a failure of a solenoid, and the like, it may be difficult to perform a control for coping therewith. For example, as illustrated in FIG. 1, when a high voltage component or high voltage apparatus, high voltage load (e.g., air conditioner, electric oil pump, low voltage direct current-direct current (DC-DC) converter (LDC), inverter, and the like) which receives DC power from a high voltage battery 12 has failed, a main relay 14 connected to the high voltage battery 12 is turned off and thus a voltage of a DC link decreases to 0, such that an operation of all the high voltage components including the electric oil pump 20 may be terminated to stop a driving of the vehicle. Further, when the supply of oil pressure is insufficient, oil pressure required for the electric oil pump is set to be fixed to substantially high oil pressure, power for driving the electric oil pump may be wasted and the components may be damaged.

The above information disclosed in this section is merely for enhancement of understanding of the background of the invention and therefore it may contain information that does not form the prior art that is already known in this country to a person of ordinary skill in the art.

SUMMARY

The present invention provides a method and a system for controlling a hybrid vehicle capable of more stably driving an electric oil pump using a counter electromotive force of a driving motor even during a failure of high voltage components within a hybrid vehicle in which oil pressure is supplied to an automatic transmission using an electric oil pump and performing emergency driving for a substantial period of time by adjusting a low voltage DC-DC converter (LDC) based on a driving state of the vehicle.

An exemplary embodiment of the present invention provides a method for controlling a hybrid vehicle including an engine, a driving motor, and an engine clutch controlling a connection between the engine and the driving motor that may include: detecting whether high voltage components for the hybrid vehicle including an air conditioner, a heater, and a low voltage DC-DC converter (LDC) have failed (e.g., experienced a failure); when at least one of the high voltage components has failed, turning off an operation of the high voltage components which are not in a fault state (e.g., are operating in a normal state without a failure) other than an electric oil pump (EOP); and operating the electric oil pump with a counter electromotive force generated from the driving motor by operating the driving motor with power of the engine while a speed (e.g., revolutions per minute—RPM) of the engine is maintained at a predetermined minimum demand speed or greater.

The method may further include: determining whether the speed of the engine is equal to or greater than the minimum demand speed; and when the speed of the engine is equal to or greater than the minimum demand speed, turning off a main relay configured to provide power of a high voltage battery to the high voltage components. In addition, the method may include: determining whether the speed of the engine is a predetermined maximum load allowable speed greater than the minimum demand speed; and when the speed of the engine is equal to or greater than the maximum load allowable speed, turning on the LDC for the hybrid vehicle.

The method may further include: when the speed of the engine is greater than the minimum demand speed and is less than the maximum load allowable speed, determining whether the counter electromotive force of the driving motor is greater than the predetermined demand power of the LDC; and when the counter electromotive force of the driving motor is greater than the defined demand power of the LDC, turning on the LDC or otherwise, variably operating the LDC depending on the counter electromotive force of the driving motor. When the driving motor is operated with the power of the engine, an integrated starter and generator (ISG) may also be operated with the power of the engine.

Another exemplary embodiment of the present invention provides a method for controlling a hybrid vehicle including an engine, a driving motor, and an engine clutch controlling a connection between the engine and the driving motor that may include: detecting a failure of high voltage components for the hybrid vehicle including an air conditioner, a heater, and a low voltage DC-DC converter (LDC); when at least one of the high voltage components has experienced a failure (e.g., is in a failure state), turning off an operation of the high voltage components which are not in a fault state (e.g., operate in a normal state with no failure) other than an electric oil pump (EOP); and operating the electric oil pump with a counter electromotive force generated from the integrated starter and generator (ISG) by operating the ISG for the hybrid vehicle with power of the engine while a speed (RPM) of the engine is maintained at a defined minimum demand speed or greater.

Yet another exemplary embodiment of the present invention provides a system for operating a hybrid vehicle including an engine, a driving motor, and an engine clutch configured to connect the engine and the driving motor, that may include: high voltage components for the hybrid vehicle including an air conditioner, a heater, and a low voltage DC-DC converter (LDC); an electric oil pump (EOP) configured to supply actuating oil pressure to a transmission; a high voltage battery configured to supply a high voltage to the high voltage components for the hybrid vehicle; a main relay configured to adjust a supply of the high voltage to the high voltage battery; an engine controller unit (ECU) configured to operate the engine; a motor controller unit (MCU) configured to operate the driving motor; a hybrid controller unit (HCU) configured to operate the hybrid vehicle; and in response to detecting a failure of at least one of the high voltage components, an emergency driving controller may be configured to drive the EOP with a counter electromotive force of the driver motor and/or an integrated starter-generator (ISG) for the hybrid vehicle, wherein the emergency driving controller may be operated by a predetermined program to execute the method of controlling a hybrid vehicle according to the exemplary embodiment of the present invention.

As described above, according to the exemplary embodiment of the present invention, it may be possible to more stably drive the electric oil pump using the counter electromotive force of the driving motor even during the failure of the high voltage components within the hybrid vehicle in which the oil pressure is supplied to the automatic transmission using the electric oil pump and perform the emergency driving for a predetermined period of time by operating the low voltage DC-DC converter (LDC) based on the driving state of the vehicle

BRIEF DESCRIPTION OF THE DRAWINGS

The above and other features of the present invention will now be described in detail with reference to exemplary embodiments thereof illustrating the accompanying drawings which are given herein below by way of illustration only, and thus are not limitative of the present invention, and wherein.

DETAILED DESCRIPTION

Figure 1:
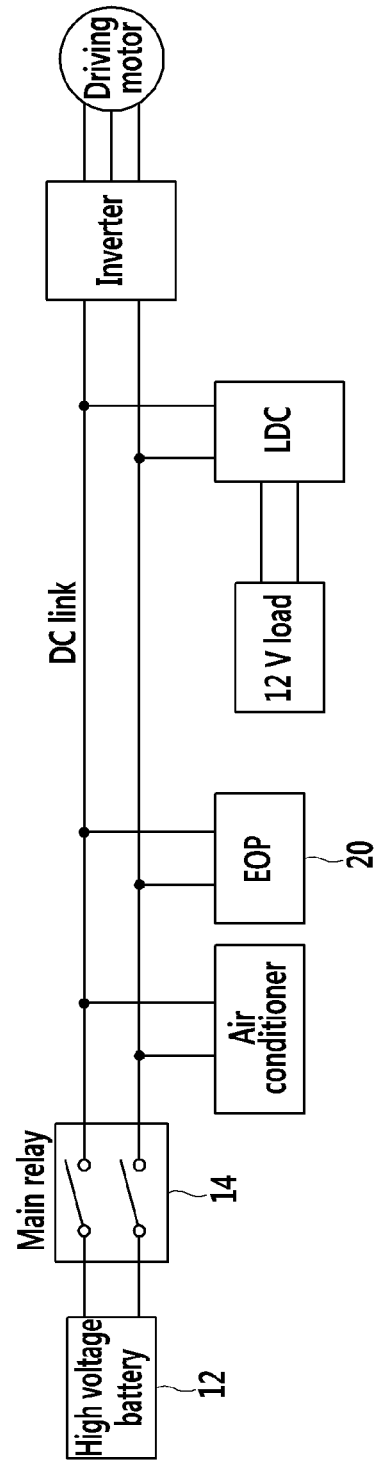
FIG. 1 is an exemplary configuration diagram of a connection circuit of high voltage components of a general hybrid vehicle according to the related art.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, the present invention will be described more fully hereinafter with reference to the accompanying drawings, in which exemplary embodiments of the invention are shown. Therefore, the present invention is not limited to the exemplary embodiments set forth herein but may be modified in many different forms. Like reference numerals designate like elements throughout the specification.

Figure 2:
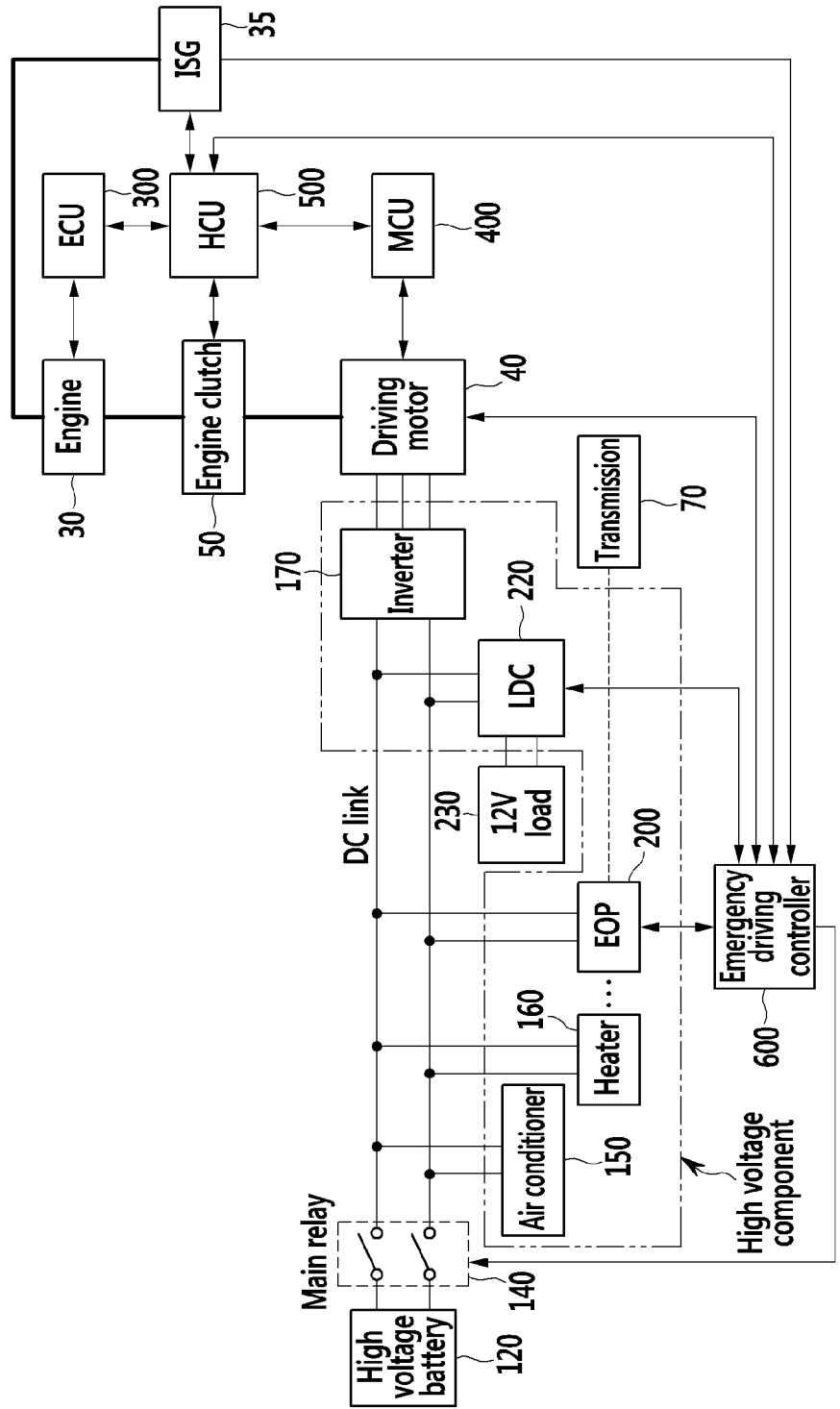
FIG. 2 is an exemplary diagram illustrating a system for controlling a hybrid vehicle according to an exemplary embodiment of the present invention.

FIG. 2 is an exemplary diagram illustrating a system for controlling a hybrid vehicle according to an exemplary embodiment of the present invention. A system for controlling a hybrid vehicle according to an exemplary embodiment of the present invention is a system which may more stably drive an electric oil pump using a counter electromotive force of a driving motor and/or an integrated starter-generator (ISG) even during a failure of high voltage components within a hybrid vehicle in which oil pressure is supplied to an automatic transmission using an electric oil pump and perform emergency driving for a predetermined period of time by operating a low voltage DC-DC converter (LDC) based on a driving state of the vehicle.

As illustrated in FIG. 2, the system for controlling a hybrid vehicle according to the exemplary embodiment of the present invention is a system for operating a hybrid vehicle which may include an engine 30, a driving motor 40, and an engine clutch 50 that connects the engine 30 and the driving motor 40. The system may include: a plurality of high voltage components for the hybrid vehicle including an air conditioner 150, a heater 160, a low voltage DC-DC converter (LDC) 220, and the like; an electric oil pump (EOP) 200 configured to supply actuating oil pressure to a transmission 70 as one of the high voltage components; a high voltage battery 120 configured to supply a high voltage to the high voltage components for the hybrid vehicle; a main relay 140 configured to adjust a high voltage supply of the high voltage battery 120; an engine controller unit (ECU) 300 configured to operate the engine 30; a motor controller unit (MCU) 400 configured to operate the drive motor 40; a hybrid controller unit (HCU) 500 configured to operate the hybrid vehicle; and when at least one of the high voltage components has failed, an emergency driving controller 600 configured to drive the EOP 300 with a counter electromotive force of the driver motor 40 and/or an integrated starter-generator (ISG) 35 for the hybrid vehicle by detecting the fault components.

The LCD 220 may be connected to a 12V load 230 to supply 12 V power and the driving motor 40 may be connected to an inverter 170 to receive driving power from the inverter 170. The driving motor 40 may be a permanent magnet driving motor and may be operated as the driving motor when the driving power is supplied from the inverter 170, but may be operated as a power generator configured to generate a counter electromotive force when rotating by a torque of the engine 30 while being coupled with the engine 30 by the engine clutch 50. When the driving motor 40 generates the counter electromotive force, providing power to a DC link through the inverter 170 will be obvious to those skilled in the art. The high voltage component may include various components requiring a high voltage, such as the inverter 170, an ISG 35, and an electric water pump (not illustrated).

In the system for controlling a hybrid vehicle according to the exemplary embodiment of the present invention illustrated in FIG. 2, components other than the emergency driving controller 600 may use components applied to the existing hybrid vehicle as they are and therefore a detailed description thereof will be omitted. The emergency driving controller 600 may include at least one microprocessor and/or hardware including the microprocessor which is operated by a predetermined program, in which the predetermined program may be formed in a series of commands to execute a method for controlling a hybrid vehicle according to the exemplary embodiment of the present invention.

According to the exemplary embodiment of the present invention, the emergency driving controller 600 may include the hybrid controller unit 500 or may be included within the hybrid controller unit 500. However, it is not to be construed that the scope of the present invention is limited as described in exemplary embodiments to be described below. The emergency driving controller may be implemented in a form different from the description of the exemplary embodiment of the present invention.

Figure 3:
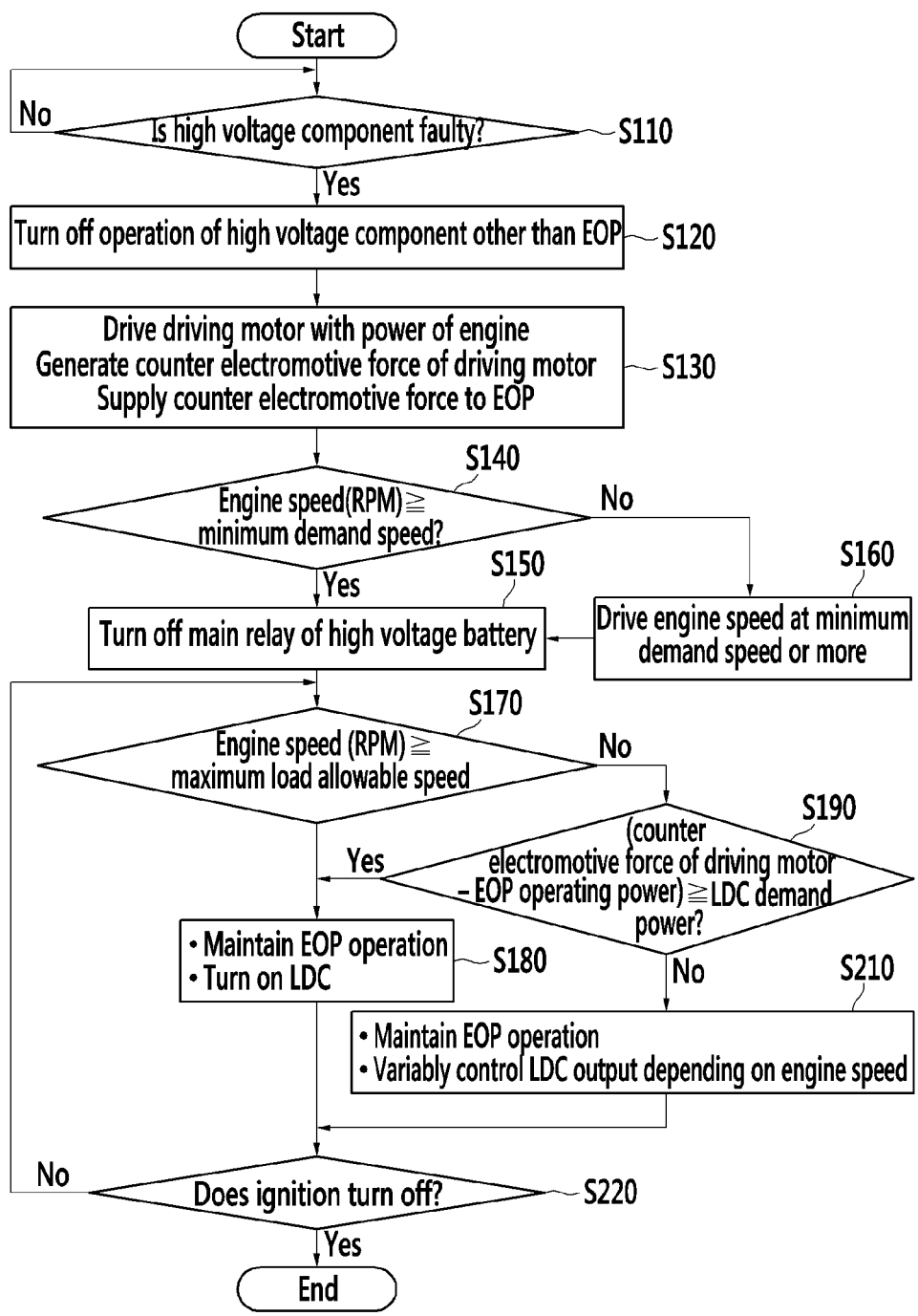
FIG. 3 is an exemplary flow chart of a method for controlling a hybrid vehicle according to an exemplary embodiment of the present invention.

Hereinafter, the method for controlling a hybrid vehicle according to the exemplary embodiment of the present invention will be described in detail with reference to the accompanying drawings. FIG. 3 is an exemplary flow chart of a method for controlling a hybrid vehicle according to an exemplary embodiment of the present invention and FIG. 4 is an exemplary graph for describing a method and a system for controlling a hybrid vehicle according to an exemplary embodiment of the present invention.

Figure 4:
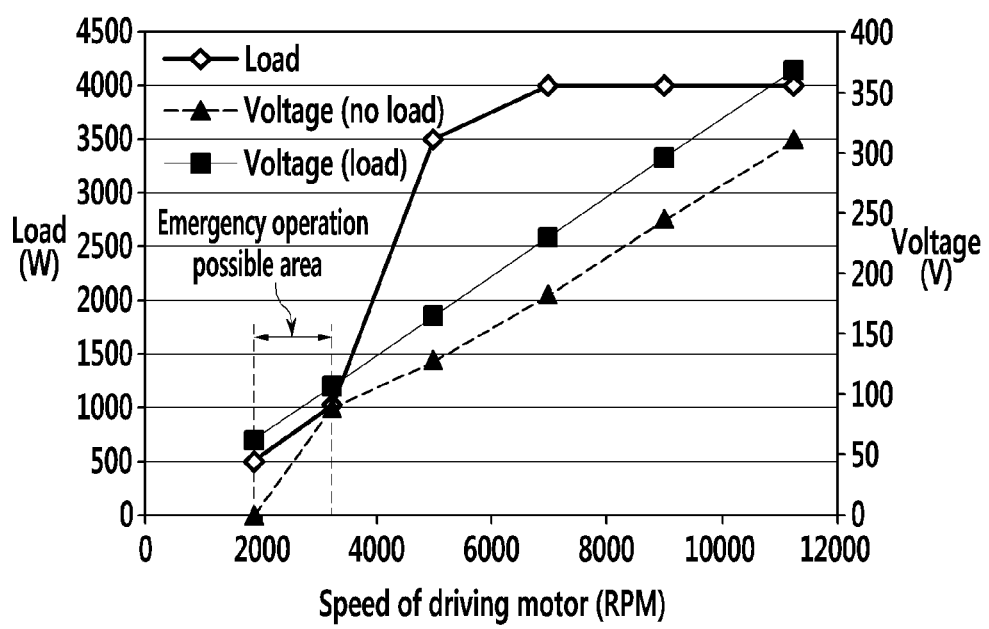
FIG. 4 is an exemplary graph for describing a method and a system for controlling a hybrid vehicle according to an exemplary embodiment of the present invention.

Referring to FIG. 4, the counter electromotive force generated from the driving motor 40 may be linked with the engine speed (RPM) to which the driving motor 40 is connected to the engine speed (RPM) via the engine clutch 50 and thus may be increased in a linear function (no-load voltage). However, when the high voltage components (or high voltage load) such as the EOP 200, the LDC 220, the air conditioner 150, and the heater 160 are operated, a voltage may decrease to 0 due to a lack of supply possible power due to the counter electromotive force and thus the high voltage system may be shut down. Further, the engine speed may be adjusted based on a driver demand speed (e.g., a driver speed intention) even though the engine speed is the emergency driving and therefore the counter electromotive power may not be freely adjusted, but when the high voltage load of the vehicle is classified and adjusted, that is, when the high voltage load of the vehicle is divided into an essential high voltage load, an intermittent high voltage load, an unnecessary high voltage load, and the like and is supplied, the emergency driving may be possible within the supply possible load (dotted line range of a graph of FIG. 4). In other words, according to the method for controlling a hybrid vehicle according to the exemplary embodiment of the present invention, as illustrated in FIG. 3, the emergency driving controller 600 may be configured to determine a failure of the high voltage components during the driving of the vehicle (S110).

The emergency driving controller 600 may further be configured to determine whether the corresponding high voltage component has failed by detecting a fault signal and a control abnormal signal (e.g., a failure signal), and the like output from the faulty high voltage components and determine whether the corresponding high voltage component has failed based on the output signal of the HCU 500. The fault signal, and the like output from the faulty high voltage component may be transferred to the HCU 500 and/or the emergency driving controller 600, and the like via a controller area network (CAN) communication.

In response to determining a failure of the corresponding high voltage component, the emergency driving controller 600 may be configured to turn off other high voltage components other than the EOP 200 to stop the operation (S120). As the method for turning off the operation of the high voltage component, the traditionally applied method may be used as it is. For example, the operation of the high voltage component may be turned off by transferring a disable bit signal to the high voltage component through the HCU 500.

After step S120, the emergency driving controller 600 may connect the engine 30 to the driving motor 40 via the engine clutch 50 to rotate the driving motor 40 with a rotating driving torque of the engine 30 to generate the counter electromotive force from the driving motor 40 (S130). The counter electromotive force generated from the driving motor 40 may be supplied to the EOP 200 via the inverter 170. The emergency driving controller 600 may connect the engine 30 to the ISG 35 to rotate the ISG 35 with the rotating driving torque of the engine 30 to generate the counter electromotive force from the ISG 35 and supply the counter electromotive force to the EOP 200.

As described above, when the counter electromotive force is generated from the driving motor 40, the emergency driving controller 600 may be configured to determine whether the speed (RPM) of the engine 30 is equal to or greater than the minimum demand speed (e.g., about 1500 rpm) (S140). The minimum demand speed may be a speed used to maintain a minimum counter electromotive voltage of the driving motor 40 for driving or operating the EOP 200 before the main relay 140 is turned off. When the speed of the engine 30 is equal to or greater than the minimum demand speed, the emergency driving controller 600 may be configured to turn off the main relay 140 as in the related art (S150), or otherwise, adjust the speed of the engine 30 to be the minimum demand speed or greater and then turn off the main relay 140 (S160 and S150).

As described above, when the EOP 200 performs the emergency driving by the counter electromotive force of the driving motor 40 and/or the ISG 35, the emergency driving controller 600 may be configured to determine whether the speed of the engine 30 is equal to or greater than the maximum load allowable speed (e.g., about 3000 rpm) or greater (S170).

The maximum load allowable speed may be the engine speed required for determining whether the LDC 220 supplying power to the 12 V load 230 is turned on. When the speed of the engine 30 is equal to or greater than the maximum load allowable speed, the counter electromotive force generated from the driving motor 40 and/or the ISG 35 is in a margin state which may be sufficient to drive or operate the EOP 200 and therefore the emergency driving controller 600 may also be configured to turn on the LDC 220 when the emergency driving controller 600 operates the EOP 200 to supply required power to the 12 V load 230 (S180).

In step S170, when the speed of the engine 30 is less than the maximum load allowable speed, whether power obtained by subtracting the power required for the operation of the EOP 200 from the counter electromotive force of the drive motor is greater than the power required for the LDC 220 may be determined (S190). In step S190, when the power obtained by subtracting the power required for the operation of the EOP 200 from the driving motor is equal to or greater than the power required for the LDC 220, the emergency driving controller 600 may be configured to determine that the counter electromotive force generated from the driving motor 40 has a sufficient margin to perform step S180, or otherwise variably operate the turn on/off of the LDC 220 based on the speed of the engine to enable the LDC 220 to supply the required power to the 12 V load 230.

When an ignition power supply is turned off during the above process, the emergency driving controller 600 may be configured to terminate the method for controlling a hybrid vehicle according to the exemplary embodiment of the present invention (S220). Accordingly, it may be possible to more stably drive the electric oil pump using the counter electromotive force of the driving motor even in response to determining a failure of the high voltage components within the hybrid vehicle in which the oil pressure is supplied to the (automatic) transmission using the electric oil pump and perform the emergency driving for a predetermined period of time (e.g., a substantial period of time) by operating the low voltage DC-DC converter (LDC) based on the driving state of the vehicle.

While this invention has been described in connection with what is presently considered to be practical exemplary embodiments, it is to be understood that the invention is not limited to the disclosed exemplary embodiments, but, on the contrary, is intended to cover various modifications and equivalent arrangements included within the spirit and scope of the appended claims.

DESCRIPTION OF SYMBOLS

30: Engine
40: Driving motor
200: Electric oil pump (EOP)
220: Low voltage DC-DC converter (LDC)
600: Emergency driving controller

What is claimed is:

1. A method for controlling a hybrid vehicle including an engine, a driving motor, and an engine clutch that connects the engine and the driving motor, comprising:
    detecting, by a controller, a failure of high voltage components for the hybrid vehicle including an air conditioner, a heater, and a low voltage DC-DC converter (LDC);
    turning off, by the controller, an operation of the high voltage components in a normal state other than an electric oil pump (EOP) in response to determining a failure of at least one of the high voltage components; and
    operating, by the controller, the electric oil pump with a counter electromotive force generated from the driving motor by operating the driving motor with power of the engine while a speed (RPM) of the engine is maintained at a predetermined minimum demand speed or greater.

2. The method of claim 1, further comprising:
    determining, by the controller, whether the speed of the engine is equal to or greater than the minimum demand speed; and
    turning off, by the controller, a main relay configured to provide power of a high voltage battery of the hybrid electric vehicle to the high voltage components when the speed of the engine is equal to or greater than the minimum demand speed.

3. The method of claim 1, further comprising:
    determining, by the controller, whether the speed of the engine is equal to or greater than a predetermined maximum load allowable speed greater than the minimum demand speed; and
    turning on, by the controller, the LDC for the hybrid vehicle when the speed of the engine is equal to or greater than the maximum load allowable speed if the LDC is turned off due to the failure of the air conditioner or the heater.

4. The method of claim 3, further comprising:
    determining, by the controller, whether the counter electromotive force of the driving motor is greater than a defined demand power of the LDC when the speed of the engine is greater than the minimum demand speed and less than the maximum load allowable speed; and
    turning on, by the controller, the LDC or variably operating the LDC based on the counter electromotive force of the driving motor when the counter electromotive force of the driving motor is greater than the defined demand power of the LDC.

5. The method of claim 1, wherein when the driving motor is operated with the power of the engine, an integrated starter and generator (ISG) is operated with the power of the engine.

6. A method for controlling a hybrid vehicle including an engine, a driving motor, and an engine clutch that connects the engine and the driving motor, comprising:
- detecting, by a controller, a failure of high voltage components for the hybrid vehicle including an air conditioner, a heater, and a low voltage DC-DC converter (LDC);
- turning off, by the controller, an operation of the high voltage components in a normal state other than an electric oil pump (EOP) in response to determining a failure of at least one of the high voltage components; and
- operating, by the controller, the electric oil pump with a counter electromotive force generated from the integrated starter and generator (ISG) by operating the ISG for the hybrid vehicle with power of the engine while a speed (RPM) of the engine is maintained at a predetermined minimum demand speed or greater.

7. A system for controlling a hybrid vehicle including an engine, a driving motor, and an engine clutch controlling a connection between the engine and the driving motor, comprising:
- a plurality of high voltage components for the hybrid vehicle including an air conditioner, a heater, and a low voltage DC-DC converter (LDC);
- an electric oil pump (EOP) configured to supply actuating oil pressure to a transmission;
- a high voltage battery configured to supply a high voltage to the high voltage components for the hybrid vehicle;
- a main relay configured to adjust a supply of the high voltage to the high voltage battery;
- an engine controller unit (ECU) configured to operate the engine;
- a motor controller unit (MCU) configured to operate the driving motor;
- a hybrid controller unit (HCU) configured to operate the hybrid vehicle; and
- wherein in response to determining a failure of at least one of the high voltage components, an emergency driving controller is configured to drive the EOP with a counter electromotive force of the driver motor and/or an integrated starter-generator (ISG) for the hybrid vehicle by detecting a faulty component,
- wherein the emergency driving controller is operated by a predetermined program to execute the method of any one of claims 1 to 5.

8. A non-transitory computer readable medium, for controlling a hybrid vehicle including an engine, a driving motor, and an engine clutch that connects the engine and the driving motor, containing program instructions executed by a controller, the computer readable medium comprising:
- program instructions that detect a failure of high voltage components for the hybrid vehicle including an air conditioner, a heater, and a low voltage DC-DC converter (LDC);
- program instructions that turn off an operation of the high voltage components in a normal state other than an electric oil pump (EOP) in response to determining a failure of at least one of the high voltage components; and
- program instructions that operate the electric oil pump with a counter electromotive force generated from the driving motor by operating the driving motor with power of the engine while a speed (RPM) of the engine is maintained at a predetermined minimum demand speed or greater.

9. The non-transitory computer readable medium of claim 8, further comprising:
- program instructions that determine whether the speed of the engine is equal to or greater than the minimum demand speed; and
- program instructions that turn off a main relay configured to provide power of a high voltage battery of the hybrid electric vehicle to the high voltage components when the speed of the engine is equal to or greater than the minimum demand speed.

10. The non-transitory computer readable medium of claim 8, further comprising:
- program instructions that determine whether the speed of the engine is equal to or greater than a predetermined maximum load allowable speed greater than the minimum demand speed; and
- program instructions that turn on the LDC for the hybrid vehicle when the speed of the engine is equal to or greater than the maximum load allowable speed if the LDC is turned off due to the failure of the air conditioner or the heater.

11. The non-transitory computer readable medium of claim 10, further comprising:
- program instructions that determine whether the counter electromotive force of the driving motor is greater than a defined demand power of the LDC when the speed of the engine is greater than the minimum demand speed and less than the maximum load allowable speed; and
- program instructions that turn on the LDC or variably operating the LDC based on the counter electromotive force of the driving motor when the counter electromotive force of the driving motor is greater than the defined demand power of the LDC.

12. The non-transitory computer readable medium of claim 11, wherein when the driving motor is operated with the power of the engine, an integrated starter and generator (ISG) is operated with the power of the engine.

* * * * *